July 27, 1965   J. RABINOW   3,197,752
REMOTE READING ATTACHMENT FOR METERS
Filed Oct. 2, 1962   2 Sheets-Sheet 1
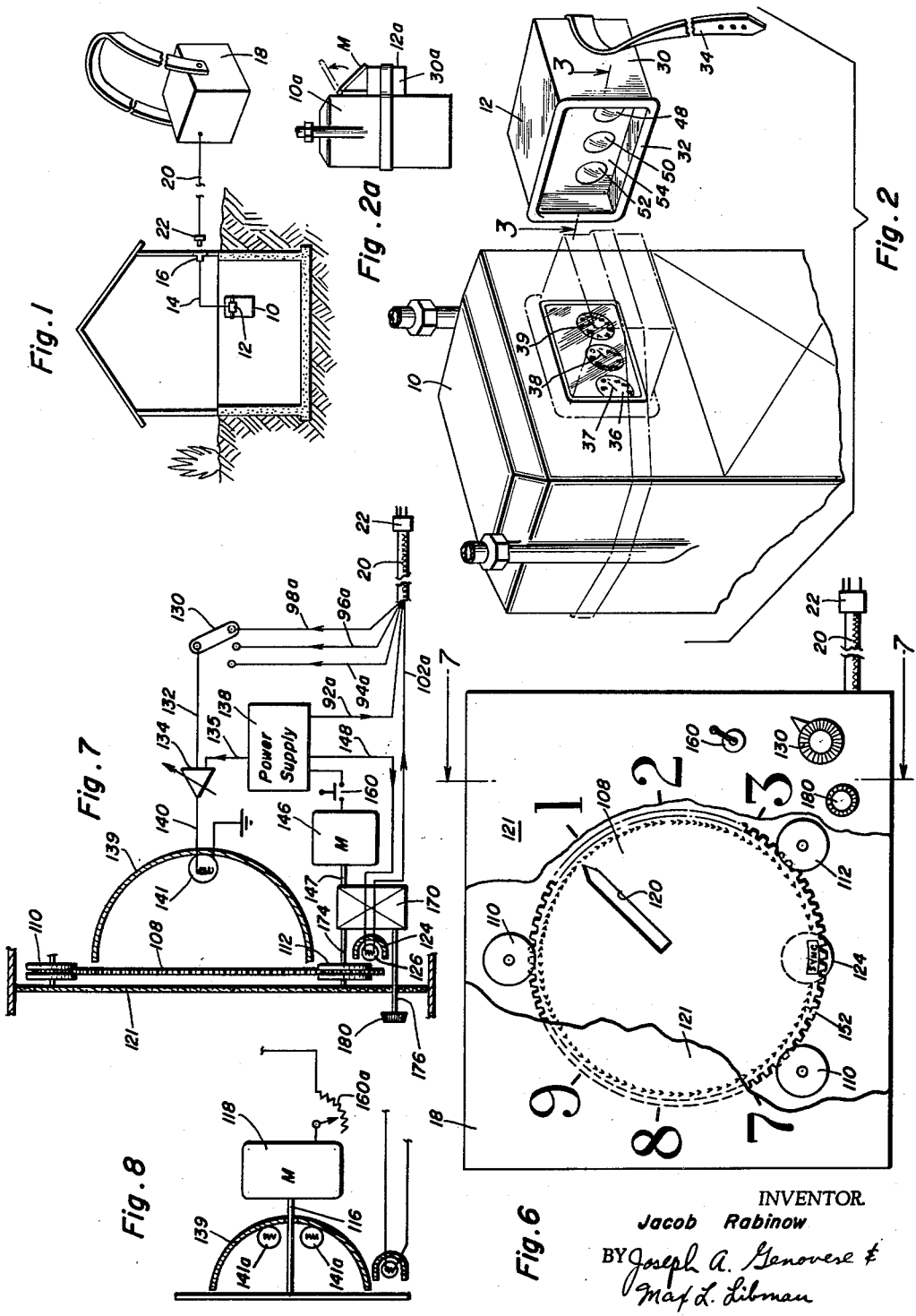
INVENTOR.
Jacob Rabinow
BY Joseph A. Genovese &
Max L. Libman
ATTORNEYS

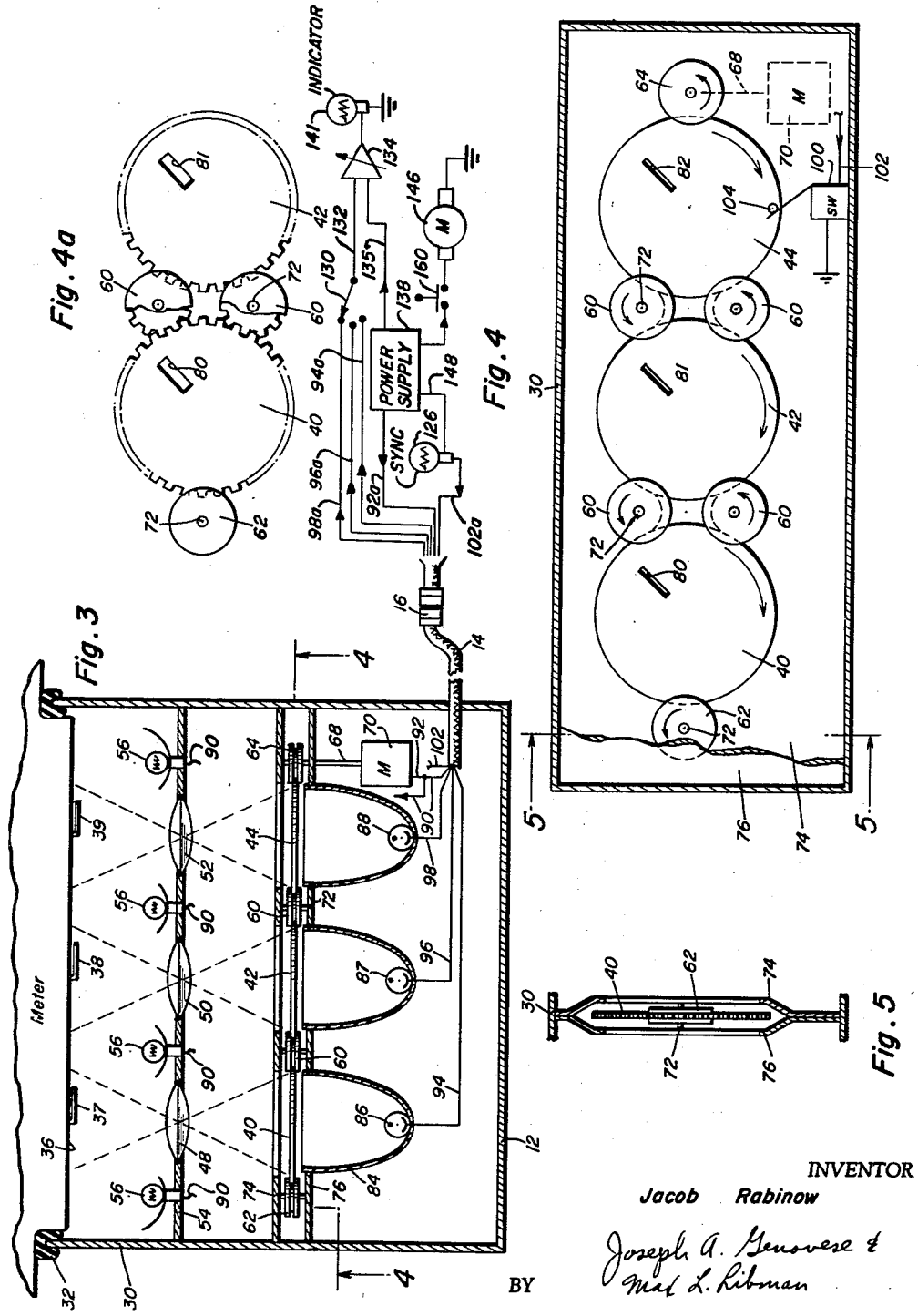

United States Patent Office 3,197,752
Patented July 27, 1965

3,197,752
REMOTE READING ATTACHMENT FOR METERS
Jacob Rabinow, Bethesda, Md., assignor, by mesne assignments, to Control Data Corporation, Minneapolis, Minn., a corporation of Minnesota
Filed Oct. 2, 1962, Ser. No. 227,752
5 Claims. (Cl. 340—206)

This invention relates to remote reading systems and particularly to attachments for meters or other devices having visual indicators for remotely reading the position of the indicators by optical means which require no physical connection with the operating mechanism and/or circuits of the meter.

The term "meter" as used herein is defined as any meter, instrument or device which has a movable indicator member whose position provides intelligence of any kind.

There have been a number of proposals for indicating and/or recording the instantaneous settings of indicators of utility meters, e.g., gas, electric, etc., at a location remote from the meter. Patents Nos. 1,244,634 and 1,245,588 disclose typical examples. The attachments described in the above patents and other attachments (of which I am aware) for similar purposes have a common difficulty. Each requires a physical connection with the mechanism or circuits of the meter.

An object of my invention is to provide a remote reading attachment for meters, which requires no physical attachment or alteration to the internal mechanism or circuits of the meter. I achieve this by optically scanning the indicator area of the meter and conducting the scan outputs, as electrical signals, over lines to a read unit, which is preferably a part of a portable instrument.

In general, my invention may be used in a manner similar to that described in U.S. Patent No. 3,006,712 where a utility meter is within a building and a portable unit is carried by the utility company employee. My scanning unit is placed in optical alignment with the indicator area of the meter, and in the usual installation, the scanning unit is permanently attached to the meter, in the sense that once it is connected to the meter case, it need not be removed. A cable extends from the scanning unit and through the building wall to terminate in a socket. The portable unit (carried by the utility company employee) has a power supply and is equipped with a cable terminating in a plug to fit the socket. Consequently, when it is time to read the meter, the employee need only make the plug and socket connection on the exterior of the building, thereby completing the circuit of the scanner so that the scanner operates only during the time that a reading is actually being made.

As inferred above, my invention includes two major units. One unit is provided for each meter and is to be permanently fixed with respect to the meter. Thus, there will be one scanning unit required for each meter that is to be read. The other major unit is, in some embodiments of my invention, a portable device which includes a power supply for the individual scanning units, together with other necessary components to transduce the scan information into intelligible data at the portable unit. One form of intelligible data is a visual indication of the position of the meter indicator members, usually hands. For example, this can be accomplished by having an indicator disc similar to one of the scanning discs rotated in synchronism with the scanning discs. By relying on inexpensive photocells associated with the scanning discs at the meter and a source of illumination, the position of the meter indicator member (hand) can be sensed and the position information conducted (in the form of electrical signals) to a source of illumination in the portable unit. This source of illumination is "fired" at the time that the rotary disc achieves an angular position corresponding to the angular position of a scanning disc at the instant that the meter indicator member (hand) is detected.

The concept of recording information similar to the above has already been suggested, for instance in Patent No. 3,006,712. Accordingly, in addition to or in lieu of the visual manifestation at the portable unit (described above), I can use any one of the prior recording techniques, e.g., as disclosed in the above noted prior patents. It has also been proposed to transmit meter-reading data over telephone lines to a central office for accounting and billing purposes. I can use my basic scanning system to develop meter-hand position information and transmit this information over telephone lines as has been proposed in connection with remote reading and recording systems of types other than an optical scanning system.

I am aware of various prior scanning systems as used in television cameras and receivers, facsimile equipment, reading machines, etc. The prior scanning systems, to a greater or lesser degree, operate on the same principle. They each cover an area with a raster of scan lines and extract information from the area in this way. My scanning system differs from these by examining an area in one prescribed path to detect the angular position of a member, for instance an indicator hand. Thus, the raster concept is not relied upon in my scanning system.

Another object of my invention is to provide a novel scanning system which investigates a predtermined portion of an area to detect the angular position of a member in that area.

There is a reluctance to alter conventional utility meters to accommodate separate attachments. Further, prior remote-reading attachments for meters have been complex and/or present serious requirements for connecting to the internal circuits or mechanisms of the meters. In contrast to this, my invention is embodied as a simple attachment which can easily be installed, even by the home owner. The person installing my attachment is in no way required to enter the utility meter. Indeed, my attachment can be supplied with a magnetic clamp or strap having a buckle, and the attachment connected to the meter by either (or equivalent) means. The cable with which my scanning attachment is equipped, is a current conductor, but only when the utility company employee connects the indicator instrument to it. Thus, during installation the person making the installation does not deal with live conductors.

The complete isolation of my attachment from the circuits and mechanisms of a meter provides more than a superficial advantage. There are numerous models, manufacturers' makes and kinds of meters already installed in buildings, particularly dwellings in different areas of the country. The only requirement of my attachment is that the meter have indicators, and even these need not be the same for each meter. It is evident that it is a much easier task to install my attachment, which simply fits against the face of the meter, than it is to install prior remote-reading attachments which require as little as a single wiring or mechanism connection with the existing meter.

Other objects and features of importance will become apparent in following the description of the illustrated form of my invention which is given by way of example only.

FIGURE 1 is a diagrammatic view showing a building having a conventional utility meter equipped with my attachment, together with the portable unit to be used therewith.

FIGURE 2 is a diagrammatic perspective view of the utility meter in FIGURE 1, showing how my attachment fits over the indicator area of the meter.

FIGURE 2a is a diagrammatic view showing a modification.

FIGURE 3 is an enlarged sectional view taken approximately on line 3—3 of FIGURE 2, this view also including a diagrammatic showing of the circuit of my portable reading unit.

FIGURE 4 is an enlarged sectional view taken on line 4—4 of FIGURE 3.

FIGURE 4a is a fragmentary view showing a modification where the scanning discs are gear-coupled so that each operates synchronously with the other.

FIGURE 5 is a sectional view taken approximately on line 5—5 of FIGURE 4.

FIGURE 6 is a fragmentary top view of my portable unit.

FIGURE 7 is a diagrammatic partially sectional view taken on line 7—7 of FIGURE 6, showing the electro-optical and mechanical features of the portable unit.

FIGURE 8 is a fragmentary sectional view showing a modification where the read-out disc is attached directly to a motor shaft instead of being edge driven as in FIGURES 6 and 7.

Preface

FIGURE 1 shows a building with an interior utility meter 10 provided with a scanning or sensing attachment 12. Cable 14 extends from attachment 12 and terminates in an electric socket 16. The socket is mounted to be accessible from the exterior of the building.

Portable unit 18 is carried by the utility company employee or the agent of the company and it has a cable 20 terminating in plug 22 that fits socket 16. In use, the person responsible for reading the various meters goes from building to building inserting his plug 22 into the sockets 16 and making the necessary adjustments (if any, described later) and taking down the information sensed by attachment 12 and conducted as electrical signals over cables 14, 20 to the read-out facility of the portable unit (indicator dial 108, FIGURE 6, which is visual in the illustrated embodiment).

Scanning attachment

Attachment 12 is made of a case 30 having an open front (FIGURES 2 and 3) with a light-excluding, soft gasket 32 at the periphery of the frontal opening. A "universal" type of fastening device is attached to case 30, for instance, strap 34 (FIGURE 2) of a sufficient length to embrace the girth of utility meter 10. By attaching the strap 34 fairly tightly, gasket 32 is pulled against the front surface of the meter in a manner that the frontal opening of the case 30 receives or is merely aligned with the indicator member area 36 (FIGURES 2 and 3) of the meter. The indicator members 37, 38, etc. ordinarily stand off slightly from the background area 36, and the indicator area of the meter is covered by a transparent panel such as a glass or plastic window (FIGURE 2, only). Not all meters have the indicator area set out from the front of the meter as I have shown. Notably, most electric meters have a glass enclosure with a rather flat front face. My attachment as shown in FIGURE 3 can be as easily applied to that type of meter as the meter 10 selected for illustration.

To demonstrate the principle of my invention, I have shown a meter with three indicator members 37, 38 and 39 and therefore attachment 12 has only three scanning discs 40, 42 and 44 (FIGURE 4), there being one for each indicator member 37, 38, 39 and its background area. Three lenses 48, 50 and 52 are arranged in optical alignment with the indicator members and their background, and the scanning discs 40, 42, 44. Each lens forms an image of the indicator area and indicator member on the face of the associated scanning disc. The images of the indicator areas are formed on the discs in such a manner that the rotation axis of the indicator members are concentric with those of the discs. Any suitable means can be used to support the lenses, for instance, they can be cemented in apertures in a vertical partition 54 which also excludes spurious light from the scanning discs. The indicator area and the indicators are illuminated, for instance, by electric lamps 56 with appropriate reflectors (if mounted as shown). The lamps are on one side of the partition 54, whereas the scanning discs are located on the opposite side thereof.

It is possible to mount my scanning discs 40, 42 and 44 in a manner similar to that shown in FIGURE 8 (described later in connection with the Read Unit 18). However, for convenience, I prefer to mount my three scanning discs by their edges as shown in FIGURES 4 or 4a. I have pairs of idlers 60 between adjacent discs, and single rotating members 62 and 64 at the ends of the row of scanning discs. The scanning discs 40, 42, and 44 have gear teeth and the idlers 60 and members 62 and 64 are pinions. The member 62 is an idler pinion, while member 64 is a drive pinion. Pinion 64 is connected to shaft 68 of motor 70 (FIGURE 3) while all of the idlers are mounted for rotation on idler shafts 72 located in bearings (or openings functioning as bearings) in the adjacent partition walls 74 and 76 within case 30.

The partition walls 74 and 76 (FIGURES 3–5) can be joined at the upper and lower edges (FIGURE 5) or directly connected to the top and bottom of case 30 (FIGURE 4). However, it is preferred that they be closely spaced and encompass the edges of the scanning discs to form a light trap.

Utility meter indicator members are usually radial, black hands over a white background. The hands rotate in a circular path. Thus, each scanning disc has a radial opening 80, 81, 82 approximately the width of the image of the indicator member 37, 38, etc. with which it operates. The openings 80, 81 and 82 (FIGURE 4) are long enough to cover the indicator member between its hub and outer end, but is not long enough to cover the indicia and graduations (if any) on the background area 36.

There is a light gathering device, for instance, parabolic reflector 84 (FIGURE 3) located behind each scanning disc and a photocell 86 at the focus of the reflector. As will be described later, the photocell amplifier (in the portable unit 18) is designed so that when light passes through opening 80, the photocell amplifier provides one distinguishable output (electrical signal), and when the photocell 86 receives little or no light (as when the opening 80 is covered by the black image of indicator 37) another distinguishable output is provided by the photocell amplifier. To facilitate explanation, it can be assumed that the amplifier is so designed and adjusted that when the photocell "sees" the light background area 36, there is no output from the amplifier, but when the photocell is in darkness or substantial darkness ("sees" the image of hand 37), the photocell amplifier produces an output signal.

It is now evident that when appropriate wiring connections are made (described later) by the plug and socket 16, 22, the following occurs: current is conducted on line 90 (FIGURE 3) to energize lamps 56, and current is conducted on lines 90, 92 to energize motor 70 and thereby rotate the scanning discs 40, 42 and 44. As the discs rotate, their openings 80, 81 and 82 circularly scan area 36 to "find" the images of the indicators 37, 38, 39. When a slot, for instance slot 80, detects the image of indicator 37, the output from the photocell 86 is conducted on the photocell output line 94. (The other photocells 87 and 89 have their respective photocell output lines 96 and 98). The only other feature of attachment 12 is the sync pulse generator 100 (FIGURE 4) to allow the reading unit 18 to be synchronized with disc 40, 42 and 44. A simple way to provide sync pulses is to use a switch 100 (FIGURE 4) which is connected to ground and to a line 102 which extend through cable 14 to the plug 16. A proection 104 on one of the scanning discs strikes the actuator of switch 100 at a predetermined part of the rotational travel of disc 44. Since all of the discs are locked together by the gear drive, only one sync pulse generator and line 102 is required for scanner attachment 12.

FIGURE 2a shows a modification where scanning unit 12a is identical to unit 12 (FIGURE 2) except for the mounting orientation and a folded optical path. Case 30a has an upper extension provided with a mirror $m$ on an upper hinge. When in the closed position (shown) the mirror is at an angle of approximately 45° to the indicator area of meter 10a and the scanning discs of unit 12. The advantage is that the mirror (e.g., as a part of a door) can be lifted (shown in dotted lines) for inspection of the meter indicators without removing or shifting the unit on the meter.

Read unit

The preceding description pertains almost exclusively to the attachment unit 12 which fits on the utility meter. This unit provides output information in the form of electrical signals on lines 94, 96, 98 and 102 which can be converted into a visual manifestation (as shown in FIGURE 6) and/or other manifestations such as printed records, telephone messages, etc. For visual manifestation, unit 18 has a disc 108 which is either edge mounted by idler gears 110 and a motor (146)-driven pinion 112 (FIGURES 6 and 7) or mounted on the shaft 116 of a motor 118 (FIGURE 8) as is the more customary method of mounting and rotating a scanning disc. However, my disc 108 is not a scanning disc in the usual sense. It is an indicator which rotates in synchronism with the rotation of scanning discs 40, 42 and 44 and which provides a visual indication at the instant that the slot 120 (FIGURE 6) becomes aligned with the numeral on panel 121 corresponding to that numeral with which the indicator member 37 points.

I accomplish the above as follows: disc 108 is rotated substantially at the same speed as the discs 40, 42 and 44 and in sync therewith (described later). A light reflector 139 is mounted behind disc 108, for instance, by being attached to the case of unit 18. A light source 141 is disposed within the reflector, and the light source can be an incandescent lamp or a neon lamp when higher operating speeds are desired or required. Lines 94a, 96a, and 98a in cable 20 are connected to the respective fixed terminals of a switch 130. The switch 130 is selector switch for photocells 86, 87 and 89 respectively and therefore a single conductor 132 extends from the movable switch contactor to the previously mentioned photocell amplifier 134 (FIGURE 7). The amplifier is adjustable to compensate for different light contrasts between the indicator members 37, 38, etc. and their background area 36 of different meters 10. A portable power supply 138 is connected to the amplifier 134 via line 135, and the output line 140 of the amplifier is operatively connected with lamp 141. Accordingly, it is now understood that the user can operate switch 130 to connect the successive photocells 86, 87 and 89 with amplifier 134 to enable the user to make successive readings of indicators 37, 38 and 39.

As disc 108 rotates in synchronism with the scanning discs, the slot 120 will rotate as a slave to the rotation of an opening in a given scanning disc, e.g., opening 80 in disc 40. At the instant, i.e., at the angular position that the opening 80 detects the dark image of the indicator 37, the photocell 86 provides an output which is conducted over lines 94, 94a through switch 130 to the amplifier 134 which causes the lamp 141 to flash. The user will be able to see the light through the slot 120 and will note the numeral at the outer end of the slot at the instant that the lamp 141 becomes illuminated. If one wishes, additional lamps 141a (FIGURE 8) corresponding to lamp 141 can be used.

There is no difficulty in rotating disc 108 at the same speed as discs 40, 42 and 44. Motor 146 to rotate disc 108 can be identical to the scanning disc motor 70, e.g., two similar synchronous motors. When the plug and socket (16, 22) connection is made, power supply 134 energizes motor 70 (FIGURE 3), and when switch 160 is closed motor 146 (FIGURE 6) is operated. However, there is no simple way to assure that disc 108 will be synchronized with the scanning discs. I can use synchronizing circuits but these (of which I am aware) are too expensive. I believe that providing sync pulses from switch 100 as I have shown in FIGURE 4, is a simpler method to assure exact synchronism between discs 40, 42, 44 and disc 108. As a part of the sync system, line 148 extends from the power supply to lamp 126 located adjacent to the periphery of disc 108. As will be described later, the lamp 126 acts as a strobe lamp. Lines 102 and 102a extend from the same lamp 126 through cables 20 and 14 to the switch 100 (FIGURE 4). Thus, every time that the scanning disc achieves a known angular position (FIGURE 4), switch 100 is actuated to pulse the lamp 126.

The edge portion 142 (FIGURE 6) of disc 108 has stencil-like arrows, numerals, etc. or perforations or photographic indicators which pass in front of the lamp 126 (FIGURES 6 and 7). The markings at 152 are so designed that they imply that the disc 108 should be slowed or accelerated to bring it in sync with the scanning unit, as it is rotated by motor 146. When synchronized, sync window 153 of disk 108 will be aligned with lamp 126. There are several ways to add or subtract a component of rotation to the disc 108, a very convenient one being by using a conventional differential 170 (FIGURE 7). Such a differential is shown in FIGURE 1b of Patent No. 3,069,494. Thus, shaft 147 of motor 146 provides one input to the differential and the shaft 174 is the output member of the differential. The drive pinion 112 is splined or otherwise fixed to shaft 174. The differential 170 has a manual input by way of shaft 176 and knob 180. Thus, the user, after closing switch 160 inspects the strobe light area. If the disc 108 is synchronized with the scanning discs, the word "sync" (FIGURE 6) or some equivalent indication will appear. However, if the desired synchronism does not prevail, the user simply rotates knob 180 clockwise or counterclockwise until synchronism is established that is, until the window 153 is aligned with lamp 126 at the instant that the lamp flashes. He can then read-out the correct position of the indicator members in the manner described before.

In addition to showing a different kind of mounting and means for driving disc 108, FIGURE 8 also shows an alternative method of synchronizing the indicator disc with the scanning discs 40, 42, etc. Instead of switch 160, I have shown a switch 160a with an adjustable resistor therein. In this embodiment, a D.C. motor would be suitable. By varying this resistance, the speed of the motor and its relative position can be altered.

It is understood that various changes may be made in my invention as illustrated without departing from the protection of the following claims. For example, it is not necessary to have a single scanning disc for each indicator 37, 38, etc. A single disc with its photocell and drive motor could be mounted on a carriage within casing 30, and the drive motor could be used to propel the carriage left and right so that the indicator members are successively imaged with their background concentrically on the scanning disc. Some meters have their indicator members arranged in an arc and the track (or disc 40, 42, 44 array) can be similarly configured.

I have disclosed only one indicator (disc 108 and slot 120) which services successive scan discs 40, 42, 44 by using switch 130. This is only to conserve space and equipment. I can obviously have a separate indicator disc 108 and associated mechanisms and circuits for each scanning disc 40, 42, 44 (and more, not shown)

to simultaneously manifest the angular positions of all of the indicator members of the meter. This arrangement, though slightly more expensive has advantages. When a printer or perforator is used with unit 18 (or as a part thereof) the entire message can be formed at one time. Also, it is believed that an experienced person "reads" the positions of all indicators simultaneously in a single "look." The use of a sequential read out (switch 130) may slow and reduce the efficiency of such a person, whereas a simultaneous display of all indicator members is what he is accustomed to.

I claim:

1. In a remote reading system for the indicator members of a meter, a meter unit adapted to be retained in optical alignment with the indicator members and their background, said unit including a housing, means for mounting said housing on the exterior of said meter, a plurality of motor operated scanning disks in said housing, and means to direct illumination toward said indicator members, each disk having a scan opening, means connecting said disks for rotation, photosensitive means operable with said disks to provide electrical signals in response to the scanning of said indicator members by said disk openings, portable remote read-out unit including a rotary member and a power supply, electrically conductive coupling means for separably coupling said power supply with said motor operated scanning disks, means connected with said power supply for rotating said rotary member at a speed corresponding to said scanning disks, display means associated with said rotary member, said coupling means operatively connecting said photosensitive means with said display means, and said display means controlled by the electrical signals of said photosensitive means which are conducted by said coupling means to display the angular positions of one of the indicator members.

2. The system of claim 1 and means for providing sync signals during the rotation of said disks, and means at said read-out unit for adjusting the phase of said rotary member with respect to said scanning disks in accordance with the sync signals.

3. The system of claim 1 wherein said rotary member is a disk with an aperture, and said display means include a lamp behind the last-mentioned disk, which is energized as a result of said electrical signals.

4. A reading assembly for unaltered meters, each of which has an indicator member adjacent to a contrasting background, said assembly including a meter unit provided with a casing having an opening, and means to mechanically couple the casing to the exterior of the meter with said opening facing the indicator member and its background and said meter unit being otherwise mechanically and electrically isolated from said meter, a motor operated rotary scanner having a light source and disposed in said casing, said rotary scanner being concentric with said indicator member and including a photocell which provides electrical output signals corresponding to the intensity of light impinging thereon as said rotary scanner sweeps over said background and said indicator member, and means operatively connected with said rotary scanner for providing synchronizing signals, a reading unit remote from said meter unit and having electrical coupling means to separably connect with said meter unit and to conduct both said photocell electrical output signals and said synchronizing signals from said meter unit to said reading unit, said reading unit having a rotary display member, means to adjust the rotary display member to synchronize and phase the display member with said rotary scanner in accordance with said synchronizing signals and indicating means cooperating with said rotary display member and responsive to said photocell output signals for indicating the instantaneous position of said meter indicator member owing to the synchronous speed and phase coupling between the rotary scanner and said display member.

5. The subject matter of claim 4 wherein said display member is a rotary disc, and said indicating means responsive to said photocell output signals include a lamp.

References Cited by the Examiner

UNITED STATES PATENTS

| | | | |
|---|---|---|---|
| 2,192,761 | 3/40 | Underhill | 340—183 |
| 2,321,971 | 6/43 | Becker | 340—183 |
| 2,351,081 | 6/44 | Swift | 250—236 X |
| 2,491,591 | 12/49 | Sweeny et al. | 250—236 X |
| 2,992,334 | 7/61 | Kaestner et al. | 250—236 X |
| 3,083,357 | 3/63 | Chapin et al. | 250—236 X |

NEIL C. READ, *Primary Examiner.*

ARCHIE R. BORCHELT, *Examiner.*